United States Patent
deJong et al.

(10) Patent No.: US 6,789,953 B1
(45) Date of Patent: Sep. 14, 2004

(54) OPTICAL COUPLER

(75) Inventors: Michael deJong, Ft. Worth, TX (US); Stuart R. Melton, Hickory, NC (US); Charles A. Yow, Jr., Ft. Worth, TX (US); Daniel Leyva, Jr., Arlington, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/426,365

(22) Filed: Apr. 30, 2003

(51) Int. Cl.[7] .................................................. G02B 6/38
(52) U.S. Cl. ........................................................ 385/73
(58) Field of Search ............................... 385/73–74, 19, 385/22, 36, 24, 16, 33, 115, 52

(56) References Cited

U.S. PATENT DOCUMENTS

| | | | |
|---|---|---|---|
| 5,138,676 A | 8/1992 | Stowe et al. | 385/32 |
| 5,452,393 A | 9/1995 | Stowe et al. | 385/123 |
| 6,317,533 B1 * | 11/2001 | Slater et al. | 385/22 |
| 6,335,149 B1 | 1/2002 | Xu et al. | 430/321 |
| 6,512,874 B2 | 1/2003 | Xu et al. | 385/129 |
| 6,665,464 B2 * | 12/2003 | Suzuki et al. | 385/19 |
| 2002/0039471 A1 * | 4/2002 | Watanabe et al. | 385/73 |
| 2002/0181887 A1 | 12/2002 | Lindsey | 385/61 |

FOREIGN PATENT DOCUMENTS

JP          60-008811    *  1/1985    ................... 385/56

OTHER PUBLICATIONS

R.L. Espinola et al.; A Study of High–Index–Contrast 90° Waveguide Bend Structures; Optics Express; Apr. 23, 2001, vol. 8, No. 9; pp. 517–528.
Lambda Research Optics, Inc. website; Telecom Laser Mirrors (1310, 1319, 1540 & 1550 nm); Apr. 17, 2003; pp. 1–2.
Lambda Research Optics, Inc. website; Right Angle Micro-Prisms; Apr. 17, 2003; p. 1–2.
Optical Cross Links website; Technology; Apr. 17, 2003, p. 1–2.

* cited by examiner

*Primary Examiner*—J. F. Duverne

(57) ABSTRACT

An optical coupler is provided with two receptacles for receiving connectors mounted at a predetermined angle relative to one another with a light guiding element disposed therebetween. The light guiding element may be a reflective surface, a length of optical fiber, a planar waveguide, or a polymer waveguide. The optical coupler of the present invention is preferably used in combination with an optical backplane to interconnect the backplane with a daughter-card.

12 Claims, 11 Drawing Sheets

OPTICAL COUPLER

The present invention relates to an optical coupler, and more particularly, an optical coupler for optical backplanes that allows for front side overlays.

There are several prior art systems including, for example, fibers that have been treated to have a substantially reduced diameter relative to the directed fiber portions to allow them to be directed through a predetermined angle, as illustrated in U.S. Pat. No. 5,452,393. However, that device is limited in that there is a single continuous fiber that does not allow any flexibility in changing the routing of the legs. Moreover, the device is limited to only a single optical fiber.

Other devices include connectors and fiber overlays on copper backplane panels. However, optical backplane connectors are typically feed-through devices that pass the optical signals from active or passive devices on the circuit packs or daughtercards through large holes cut in the copper backplane, and into the fiber overlays on the rear of the copper backplane. These holes create design issues as well as some electromagnetic interference problems. The fiber overlays could be mounted on the front (daughtercard side) of the backplane if there were connectors that allowed the fibers to be routed through a 90° bend from the backplane to mate with the daughtercard.

Accordingly, the present invention is directed to an optical coupler that substantially obviates one or more of the problems and disadvantages in the prior art. Additional features and advantages of the invention will be set forth in the description that follows, and in part will be apparent from the description, or may be learned by practice of the invention. The objectives and other advantages of the invention will be realized and attained by the apparatus and process particularly pointed out in the written description and claims, as well as the appended drawings.

SUMMARY OF THE INVENTIONS

To achieve certain advantages and in accordance with the purpose of the present inventions as embodied and broadly described herein, the inventions and directed to an optical coupler that includes a housing, a first opening configured to accept a first optical connector, a second opening configured to accept a second optical connector, the first opening being disposed at a predetermined angle relative to the second opening, and means for guiding light from the first opening to the second opening.

In another aspect, the inventions provide for an optical coupler that includes a housing, a first opening configured to accept a first optical connector, a second opening configured to accept a second optical connector, the first opening being disposed at a predetermined angle relative to the second opening, and a light guiding element disposed between the first and second openings to guide light from the first opening to the second opening.

It is to be understood that the foregoing general description and the following detailed description are exemplary and explanatory and are intended to provide further explanation of the present inventions as claimed.

The accompanying drawings are included to provide a further understanding of the present inventions and are incorporated in and constitute a part of the specification. The drawings illustrate several embodiments of the invention and together with the description serve to explain the principles of the invention but are not necessarily drawn to scale.

DETAILED DESCRIPTION OF THE INVENTION

Figure 1:
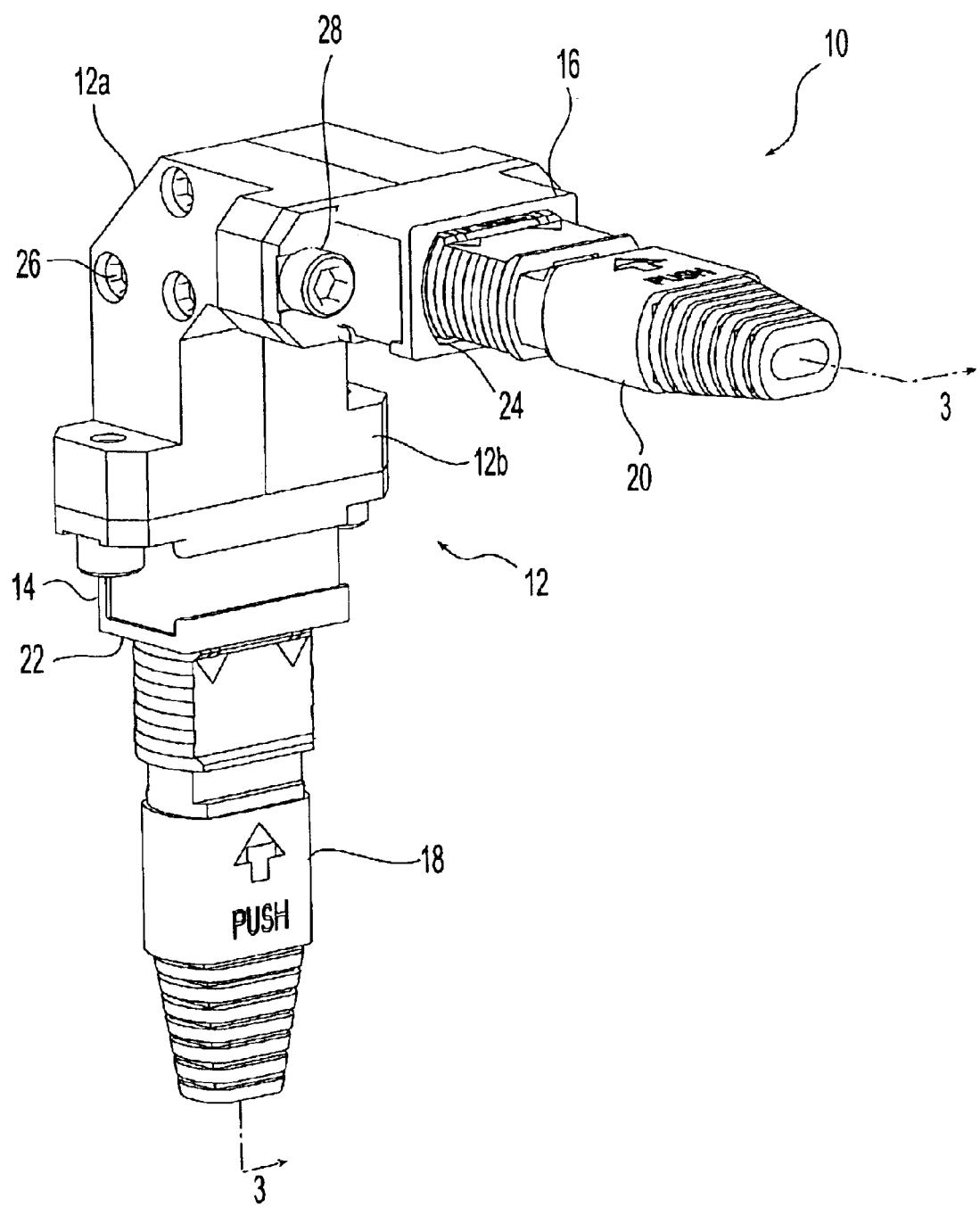
FIG. 1 is a perspective view of one embodiment of an optical coupler according the present inventions.
Figure 2:
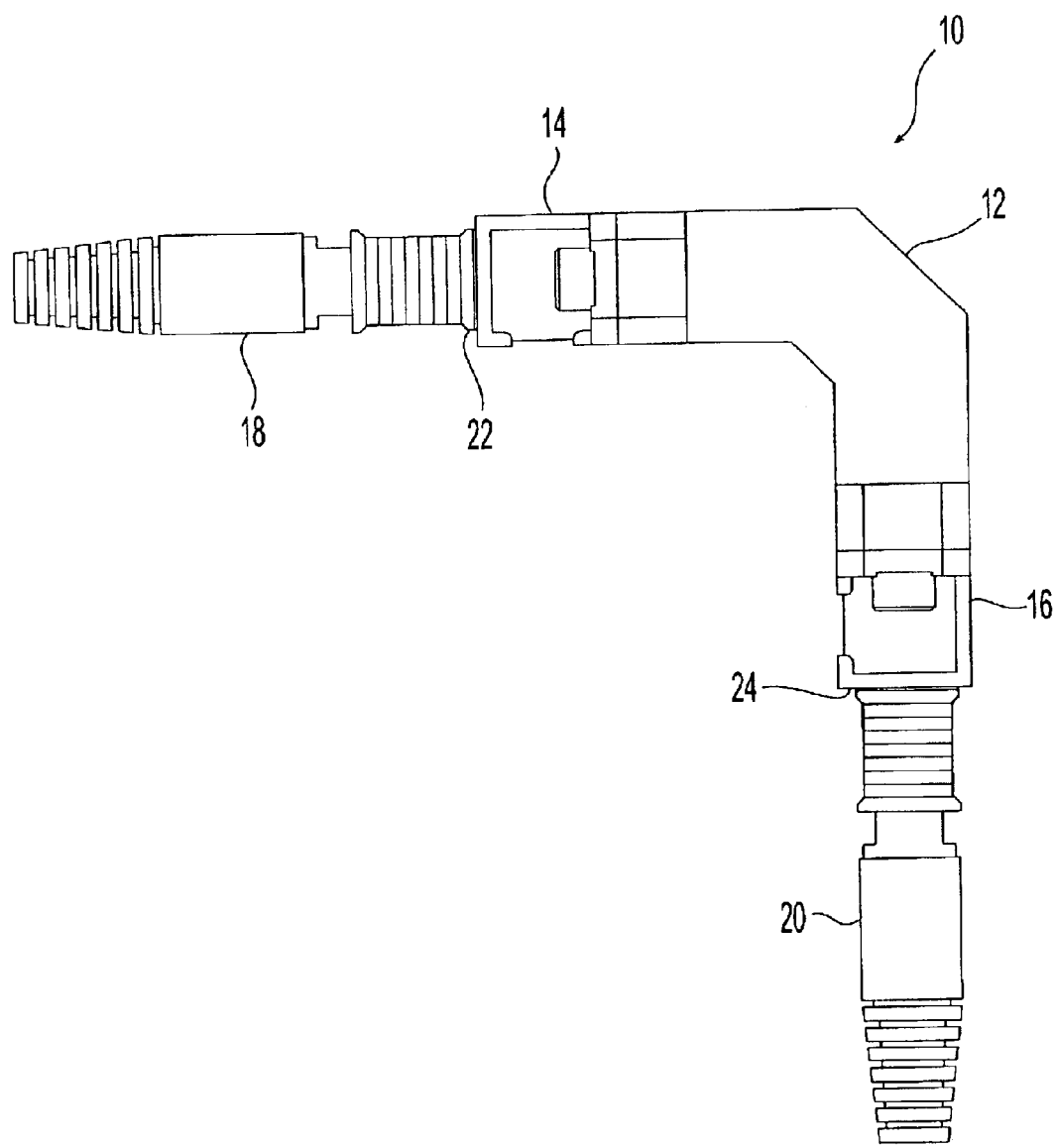
FIG. 2 is a top view of the optical coupler of FIG. 1.
Figure 4:
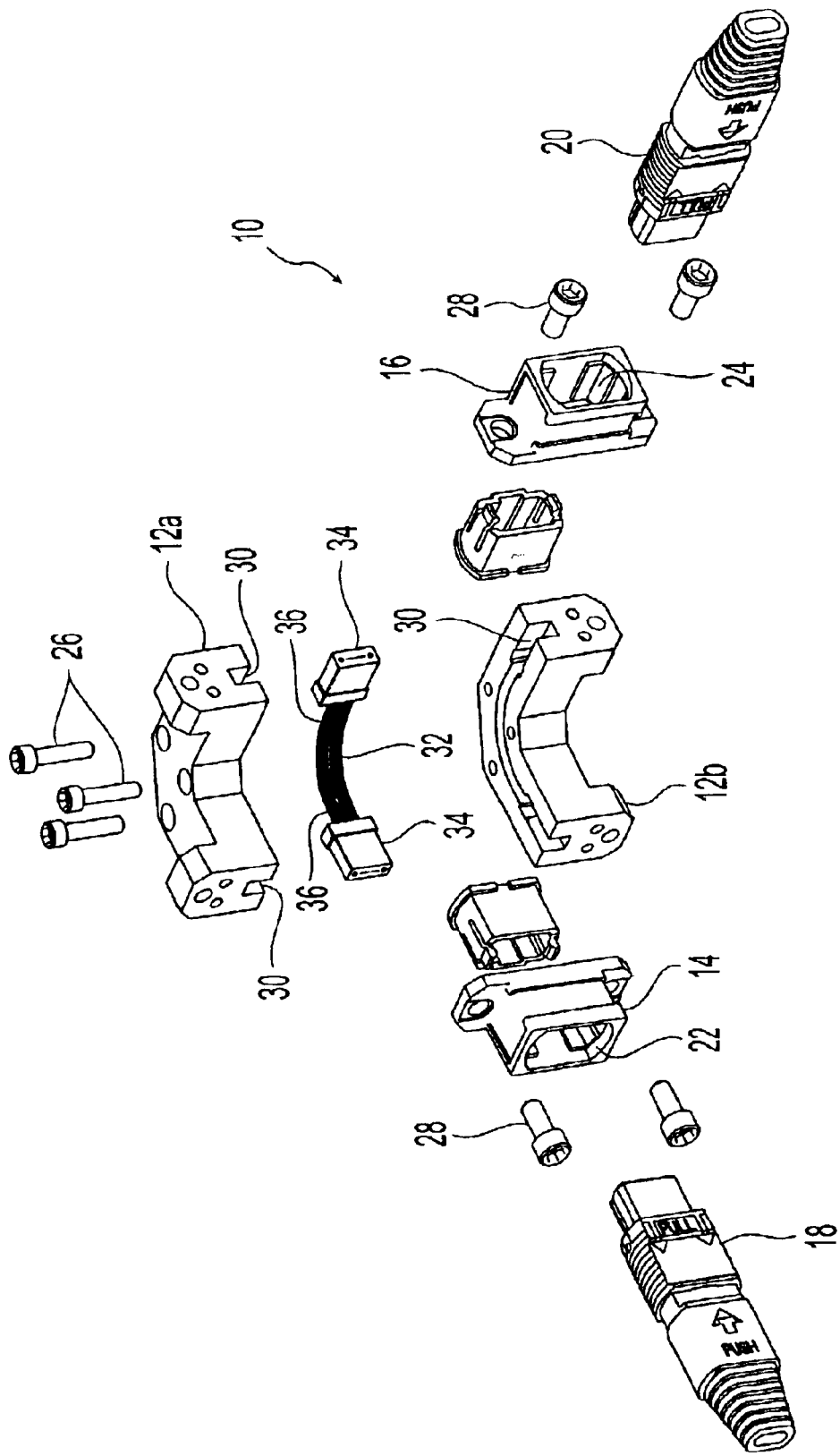
FIG. 4 is an exploded view of the optical coupler of FIG. 1.

FIG. 1 illustrates one embodiment of an optical coupler 10 according to the present invention. The optical coupler 10 has a housing 12, that is preferably made of two parts, first housing part 12a and second housing part 12b. As best seen in FIG. 4, the housing 12 also includes two receptacles 14,16. The receptacles 14,16 are configured to receive optical connectors 18,20 in a first opening 22 and a second opening 24, respectively. While the connectors 18,20 are illustrated as MTP connectors, the connectors could be of any acceptable configuration, including, for example, MPO/MTP, mini MPO, MTRJ, and MPX connectors. Similarly, the receptacles 14,16 would be configured to receive the corresponding connector. While the receptacles 14,16 are illustrated as being a separate piece from the first and second housing parts 12a,12b, they could be integral with the housing parts.

The housing parts 12a and 12b of housing 12 are connected to one another with screws 26. As illustrated in FIG. 1, the screws 26 are preferably countersunk to avoid any interference on the backplane or daughtercard (not shown). The screws 26 could be replaced by rivets, or any other applicable securing elements. The receptacles 14,16 are also attached to the first and second housing parts 12a,12b by screws 28. Again, they could be attached by any other securing elements, including being integrally formed with the first and second housing parts 12a,12b if so desired as discussed above. Attaching the receptacles 14,16 by screws 28 allows the user to attach a receptacle for a number of different connector configurations on the same first and second housing parts 12a, 12b.

Figure 3:
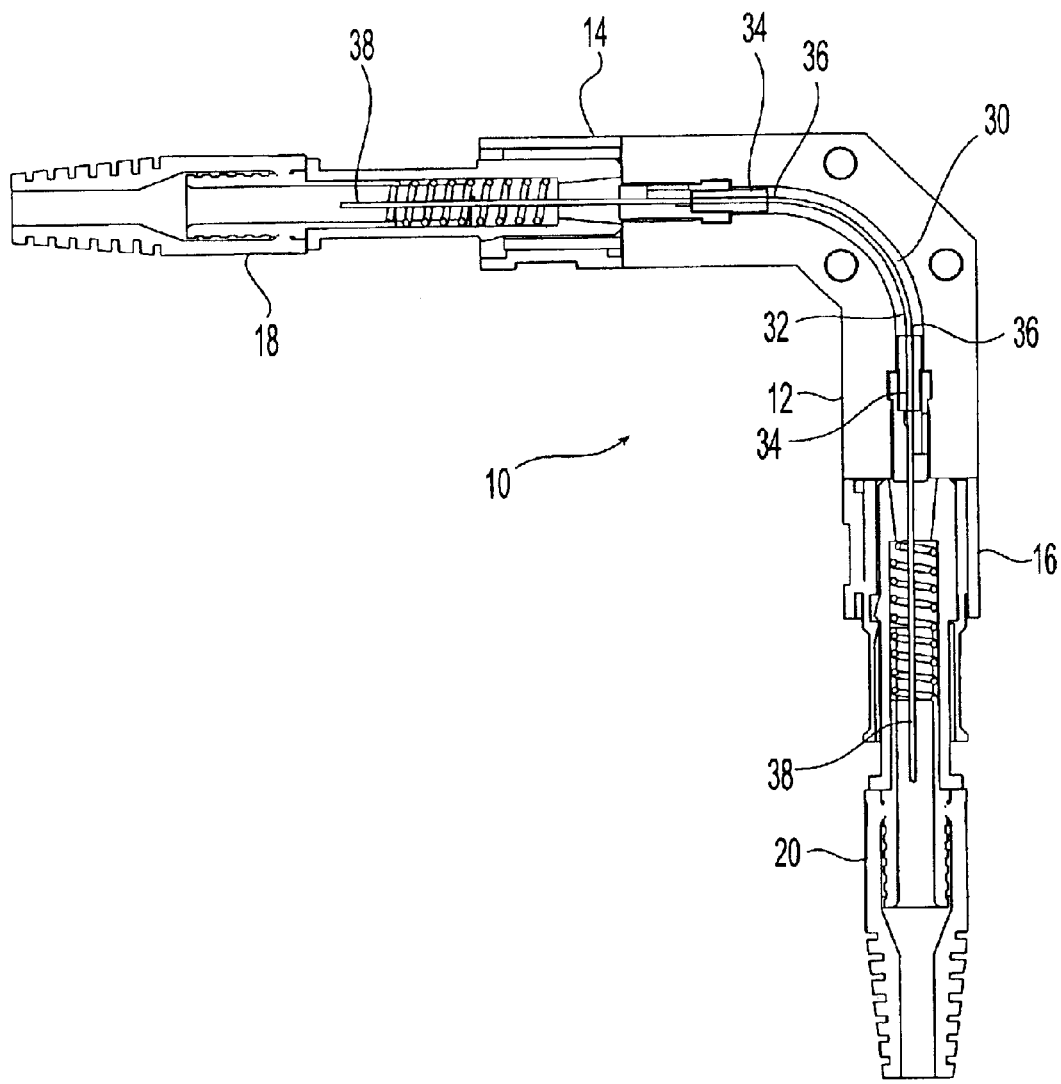
FIG. 3 is a cross sectional view of the optical coupler along the line 3—3 of FIG. 1.

First and second housing parts 12a,12b have a passageway 30 to allow a length of optical fiber ribbon 32 to be housed therein. The length of optical fiber ribbon 32, which may also be a single fiber or a plurality of single fibers, has respective ferrules 34 attached to each respective end 36, to be in optical communication with the connectors 18,20. The optical fiber ribbon 32 transmits the signal from the optical fibers 38 in one of the connectors to the optical fibers 38 (FIG. 3) in the other connector (typically through ferrules in each of the connectors). It should also be noted that while the connectors 18,20 are illustrated as being of the same configuration, they could have different configurations if the ferrule 34 mounted on the length of optical fiber ribbon 32 is of a corresponding configuration. The ferrules 34 in the housing parts 12a,12b are not floating ferrules, so there should be elements in the connectors 18,20 or receptacles 14,16 to allow the connectors 18,20 (and more specifically the ferrules in the connectors) to float or otherwise move relative to the ferrules 34.

The first and second openings 22,24 are positioned at an angle of about 90° with respect to one another. While this angle is preferable for backplane applications (since the backplane and daughter cards are at 90° to one another), other angles could also be employed. For example, a 45° angle is often used for wall mount or panel-mounted fiber connections to prevent users from looking into a live optical link and to facilitate dressing the fiber optic cable that extends from the adapter, but any angle between about 30° and about 60° is acceptable. With the optical fiber ribbon 32 being protected by the housing 12, the optical coupler is relatively robust. Additionally, the size of the optical coupler 10 need only be sufficiently large to accommodate the two connectors 18,20 and ensure that the optical fiber ribbon 32 is not bent beyond its bend radius.

Although not illustrated, the housing 12 could have structure in which to mount the optical coupler to the backplane and/or daughter card.

Another embodiment of an optical coupler 40 according to the present inventions is illustrated in FIGS. 5–8. As with the previous embodiment, the optical coupler 40 also has a housing 42, with first and second openings 44,46. Optical coupler 40 also has receptacles 62,64 for the connectors. As in the previous embodiment, these receptacles may be integral with the housing 42 rather than as separate elements as illustrated herein. In this embodiment, optical coupler 40 has a light guiding element 48 that includes a reflective surface 50 (FIG. 5) disposed at a 45° angle relative to the first and second openings 44,46. The reflective surface 50 is preferably a mirror, but could be any surface that efficiently reflects the transmission wavelengths of light from the connectors 52,54. Such mirrors are available from Lambda Research Optics in Costa Mesa, Calif.

The light guiding element 48 may also have collimating lenses 56,58 to help reduce the losses due to misalignment as the light is guided to and from the reflective surface 50. In the embodiment shown in FIGS. 5–8, the collimating lenses 56,58 are integrally formed in the light guiding element 50. However, the collimating lenses could be separate elements that are attached to the base 60, which positions the light guiding element 48 relative to the receptacles 62,64. The collimating lenses could also be disposed in the receptacles 62,64 themselves. Furthermnore, rather than the cylindrical collimating lenses 56,58, the optical coupler could also have spherical or aspherical lenses to ensure that the signal is transmitted between the connectors. Typically any such collimating lens will have an antireflective coating applied to its surfaces to reduce the optical loss associated with Fresnel reflections.

Figure 5:
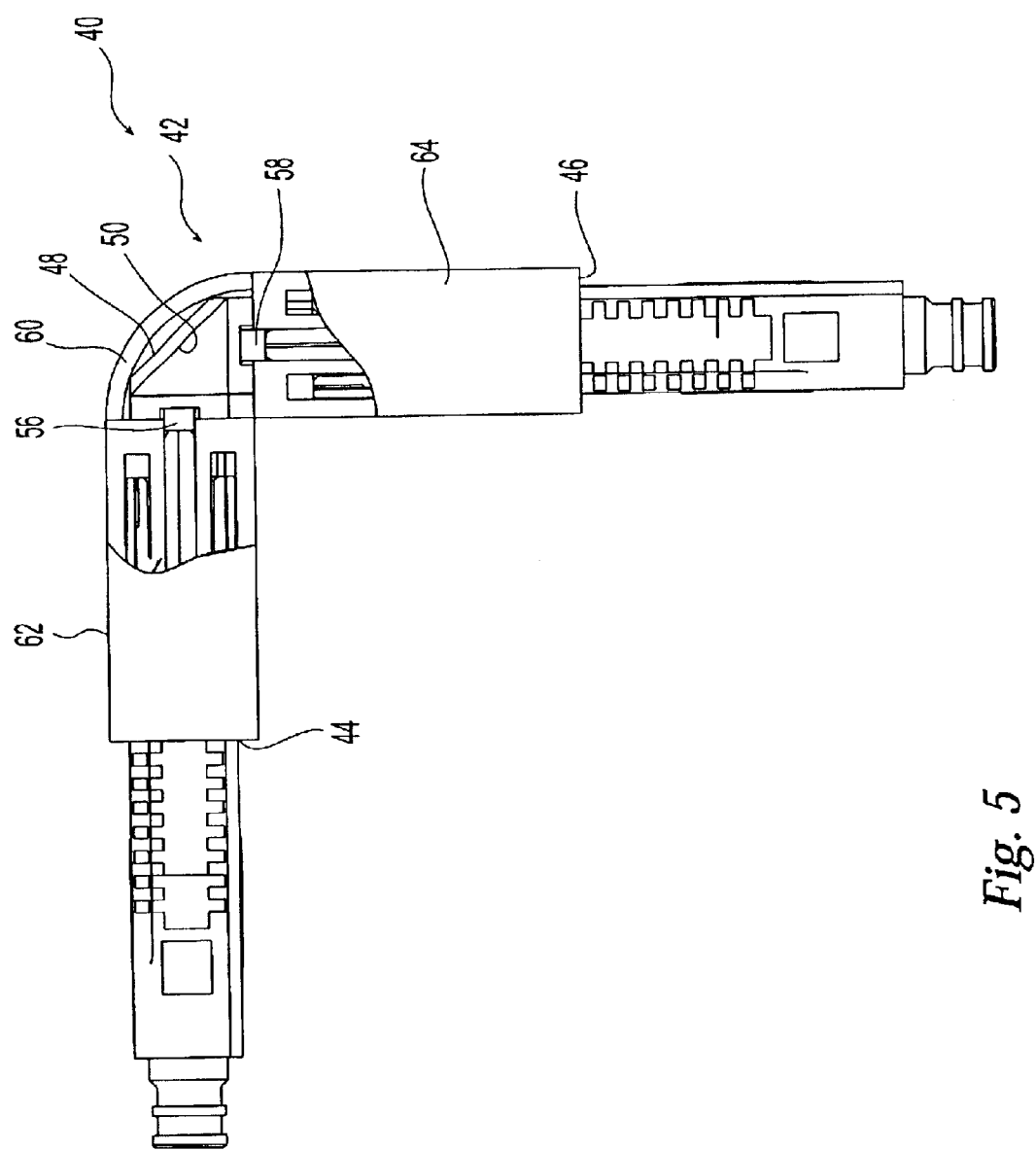
FIG. 5 is a top view of a partial cut away of another embodiment of an optical coupler according to the present inventions.
Figure 6:
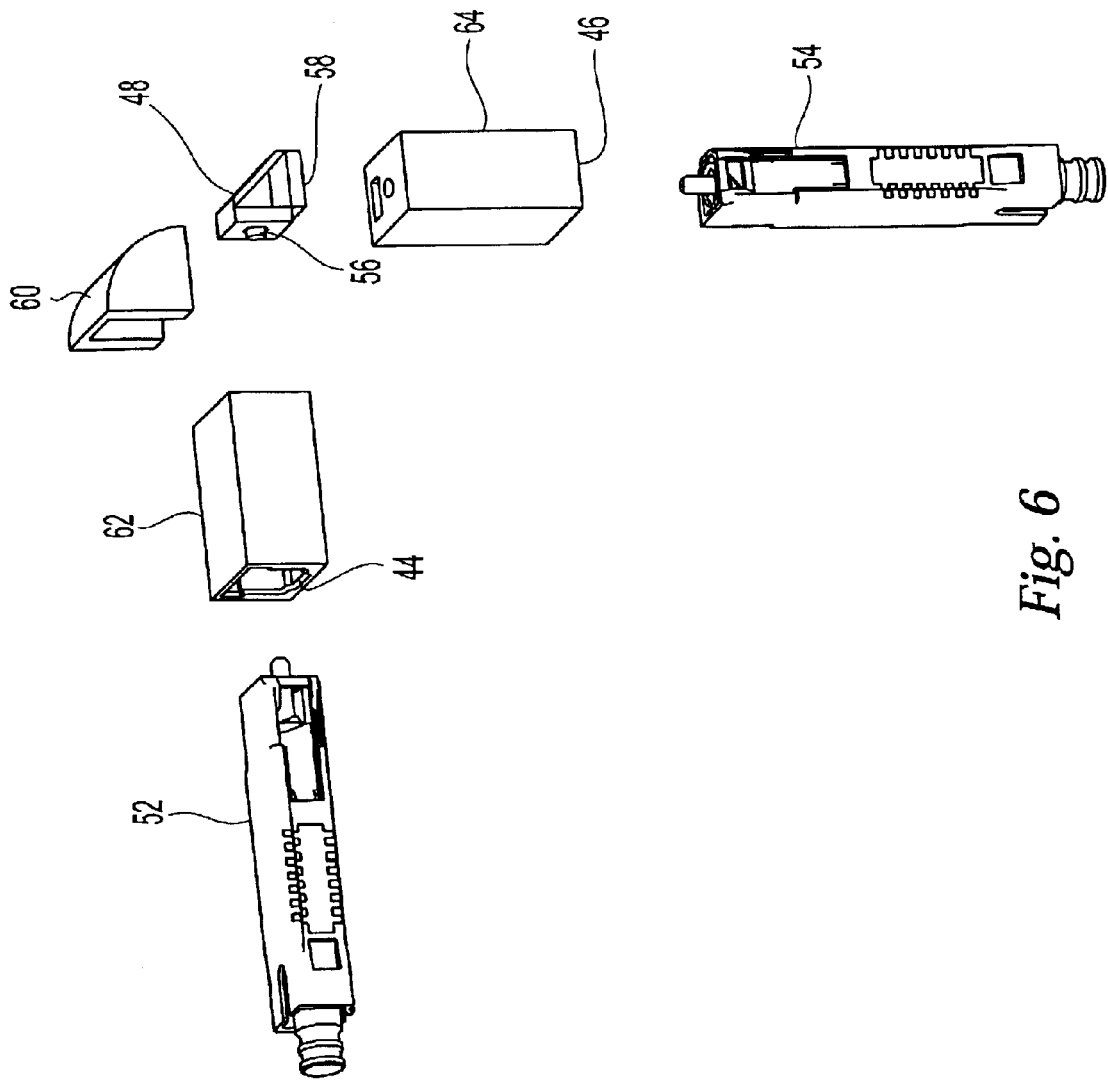
FIG. 6 is an exploded view of the optical coupler of FIG. 5.
Figure 8:
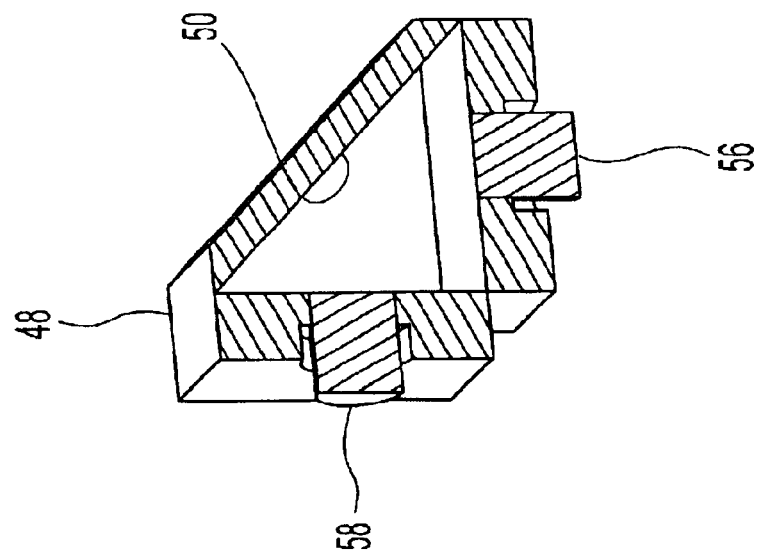
FIG. 8 is a cross sectional view of the light guiding element along the line 8—8 in FIG. 7.
Figure 7:
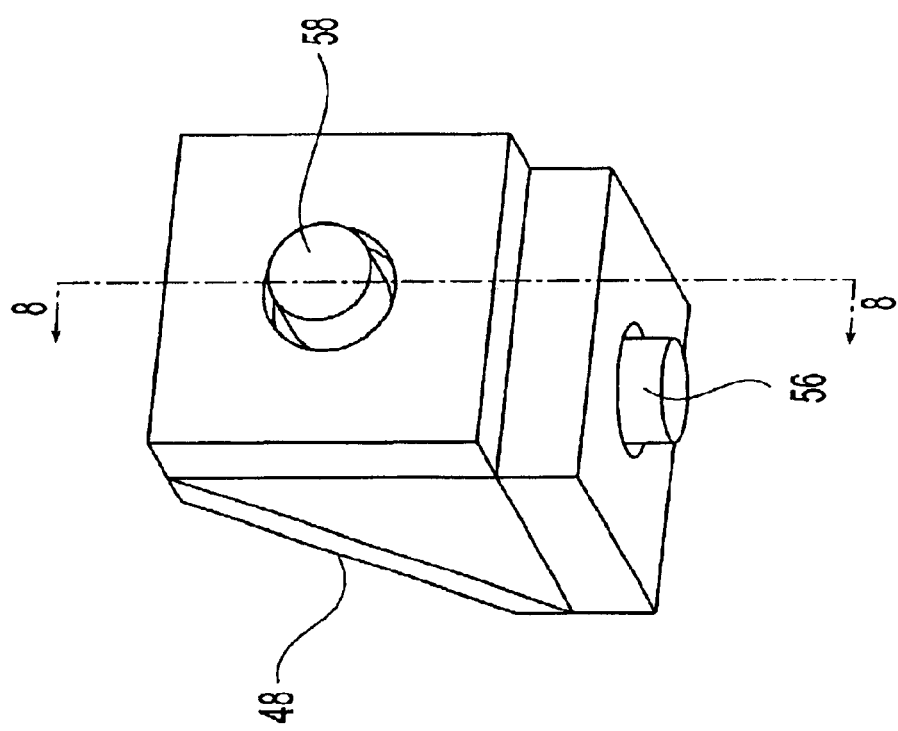
FIG. 7 is an enlarged view of the light guiding element of the optical coupler in FIG. 6.
Figure 9:
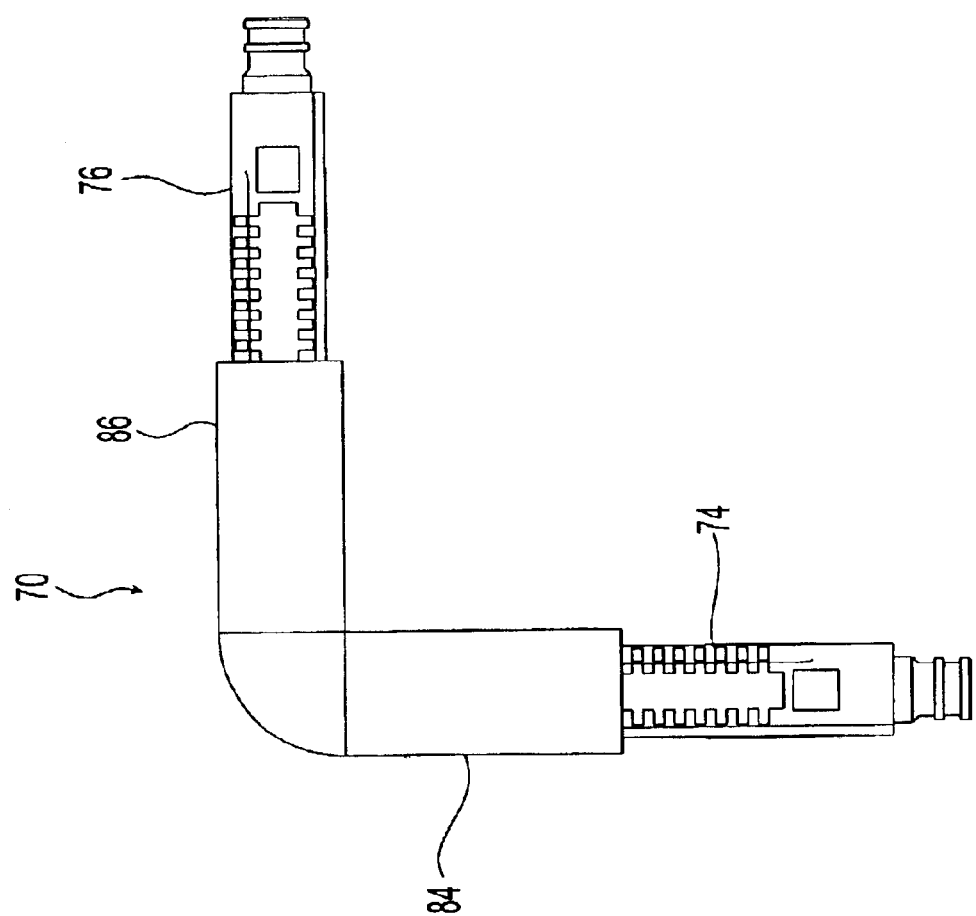
FIG. 9 is a top view of another embodiment of an optical coupler according to the present inventions with optical connectors inserted therein.
Figure 10:
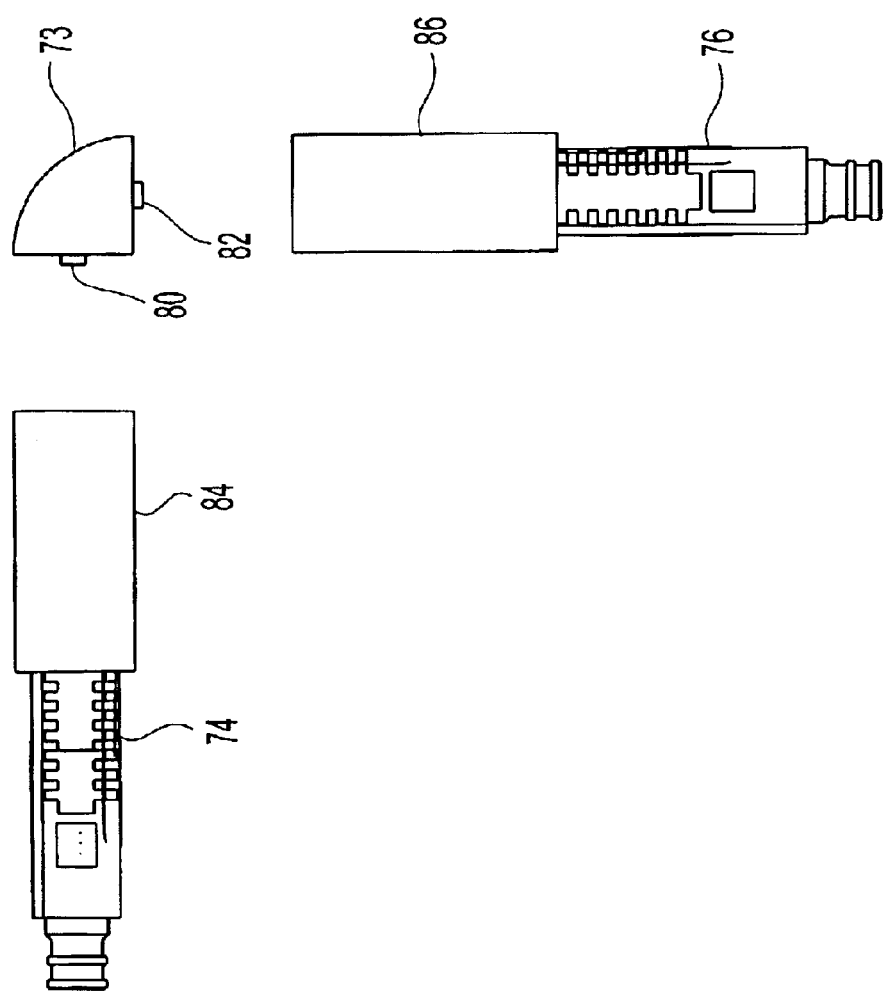
FIG. 10 is partially exploded view of the optical coupler of FIG. 9.
Figure 12:
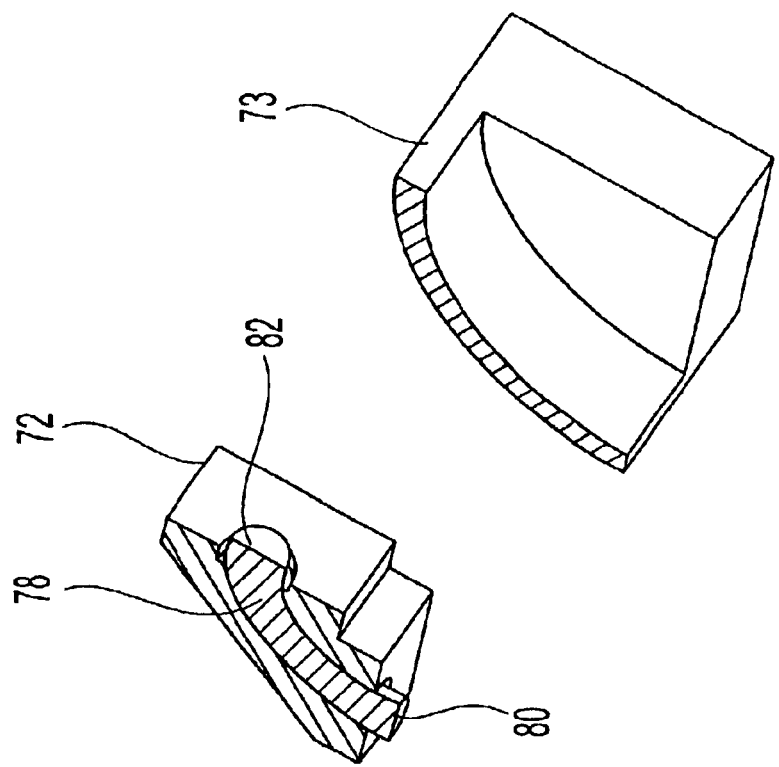
FIG. 12 is an enlarged cross sectional view of the portion of the optical coupler along line 12—12 in FIG. 11.
Figure 11:
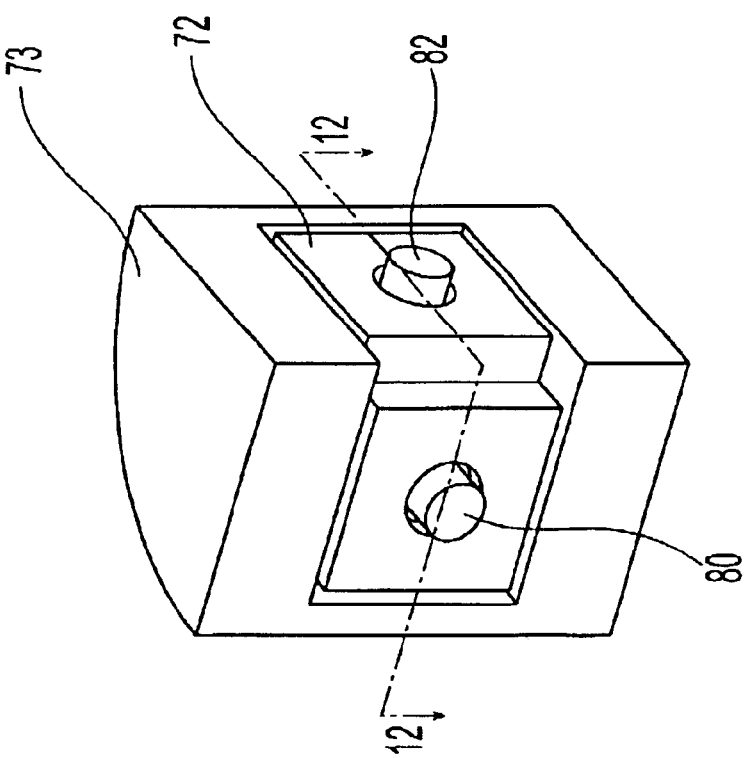
FIG. 11 is an enlarged view of a portion of the optical coupler of FIG. 9.

The connectors illustrated in FIGS. 5 and 6 are single fiber ferrules, but the present inventions include multifiber connectors as well. If multifiber connectors are used, then an array of collimating lenses would replace the lenses 56,58 to transmit the light through the optical coupler 40.

Another embodiment of an optical coupler according to the present inventions is illustrated in FIGS. 9–12. The optical coupler 70 is substantially similar to the optical coupler 40, but it has a solid light guiding element 72 in the base 73, rather than the reflective surface 50 of the previous embodiment. To transmit the light between a first connector 74 and a second connector 76, the solid light guiding element 72 has an optical pathway 78. The optical pathway 78 has an index of refraction that is different from the index of refraction of the light guiding element 72. Since the pathway has a different index of refraction (preferably higher) than the rest of the light guiding element 72, the light will, as in optical fiber, be trapped in and guided through the optical pathway 78 and be transmitted between connectors. The optical pathway 78 can be made in a number of different ways, including being formed with lithography methods in a polymer material as disclosed in U.S. Pat. No. 6,512,874, or being formed in a planar waveguide material such as lithium niobate, silicon or silica using semiconductor manufacturing techniques as disclosed in U.S. Pat. No. 6,389,209.

As in the previous embodiments, the light guiding element 72 may also have collimating lenses 80,82 associated with it. They may be integrally formed or be an additional piece attached to the receptacle 84,86 for the connectors 74,76.

Figure 13:
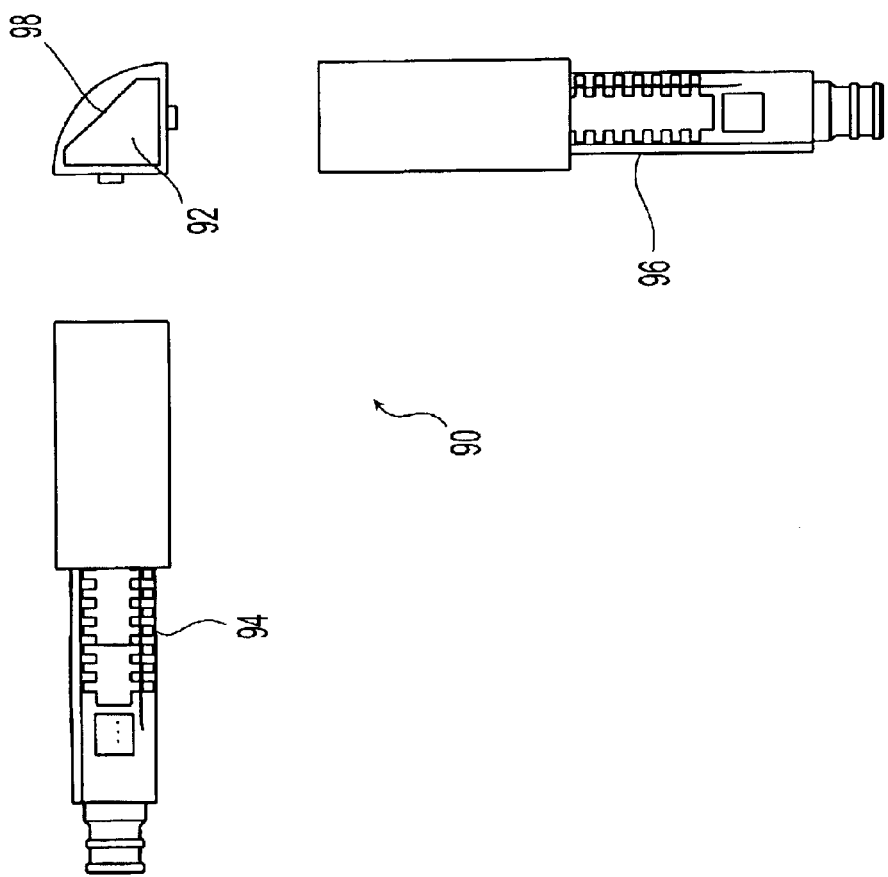
FIG. 13 is a partially exploded top view of another embodiment of an optical coupler according to the present inventions with the housing partially cut away to show the prism.

Another embodiment of optical coupler 90 according to the present inventions is illustrated in FIG. 13. This embodiment is similar to the previous embodiment; however, rather than having a pathway through the light guiding element 92, the light guiding element 92 acts as a prism. The light from the connectors 94,96, reflects off the back surface 98 due to the differences in the reflective index of the light guiding element 92 and the air or other matter behind the back surface 98. Such prisms are also available from Lambda Research Optics.

It will be apparent to those skilled in the art that various modifications and variations can be made in the optic couplers of the present inventions without departing from the spirit or scope of the inventions. Thus, it is intended that the present inventions cover the modifications and variations of the inventions provided they come within the scope of the appended claims and their equivalents.

We claim:

1. An optical coupler comprising
a housing;
a first opening in the housing configured to accept a first optical connector comprising a first multifiber ferrule having a plurality of optical fibers mounted thereon;
a second opening in the housing configured to accept a second optical connector comprising a second multifiber ferrule having a plurality of optical fibers mounted thereon, the first opening being disposed at a predetermined angle relative to the second opening; and
means for guiding light from the first opening to the second opening comprising a length of optical fiber ribbon having a multifiber ferrule attached at each end.

2. The optical coupler of claim 1, wherein the optical fiber ribbon comprises a plurality of optical fibers mounted on the multifiber ferrules at each end thereof and wherein the optical fibers of the first multifiber ferrule and the optical fibers of the second multifiber ferrule are in optical communication with the optical fibers of the optical fiber ribbon.

3. The optical coupler of claim 1, wherein the predetermined angle is about 90°.

4. The optical coupler of claim 1, wherein the predetermined angle is between about 30° and about 60°.

5. The optical coupler of claim 1, further comprising a first receptacle mounted in the first opening to engage at least a portion of the first optical connector and a second receptacle mounted in the second opening to engage at least a portion of the second optical connector.

6. An optical coupler comprising a housing;

a first opening in the housing configured to accept a first optical connector;

a second opening in the housing configured to accept a second optical connector, the first opening being disposed at a predetermined angle relative to the second opening; and a light guiding element disposed between the first and second openings to guide light from the first opening to the second opening, the light guiding element defining an optical pathway having an index of refraction that is different than the index of refraction of the light guiding element.

7. The optical coupler of claim 6, wherein the light guiding element comprises a planar waveguide.

8. The optical coupler of claim 6, wherein the light guiding element comprises a polymer waveguide.

9. The optical coupler of claim 6, where the light guiding element comprises at least one collimating lens.

10. The optical coupler of claim 6, wherein the predetermined angle is about 90°.

11. The optical coupler of claim 6, wherein the predetermined angle is between about 30° and about 60°.

12. The optical coupler of claim 6, further comprising a first receptacle mounted in the first opening to engage at least a portion of the first optical connector and a second receptacle mounted in the second opening to engage at least a portion of the second optical connector.

* * * * *